United States Patent [19]
Keshavaraj

[11] Patent Number: 5,931,498
[45] Date of Patent: Aug. 3, 1999

[54] SIMPLIFIED AIR BAG CONFIGURATION

[75] Inventor: Ramesh Keshavaraj, LaGrange, Ga.

[73] Assignee: Milliken & Company, Spartanburg, S.C.

[21] Appl. No.: 08/996,620

[22] Filed: Dec. 23, 1997

Related U.S. Application Data

[63] Continuation-in-part of application No. 08/916,190, Aug. 21, 1997, Pat. No. 5,855,393.

[51] Int. Cl.$^6$ .................................................. B60R 21/16
[52] U.S. Cl. ........................................................ 280/743.1
[58] Field of Search .............................. 280/743.1, 743.2, 280/728.1

[56] References Cited

U.S. PATENT DOCUMENTS

| | | | |
|---|---|---|---|
| 3,792,873 | 2/1974 | Buchner et al. | 280/150 |
| 4,944,529 | 7/1990 | Backhaus | 280/743.1 |
| 5,087,071 | 2/1992 | Wallner et al. | 280/743.1 |
| 5,090,729 | 2/1992 | Watanabe | 280/743.1 |
| 5,310,216 | 5/1994 | Wehner et al. | 280/743.1 |
| 5,316,337 | 5/1994 | Yamaji et al. | 280/743.1 |
| 5,423,273 | 6/1995 | Hawthorn et al. | 112/441 |
| 5,454,594 | 10/1995 | Krickl | 280/743.1 |
| 5,520,414 | 5/1996 | Bishop | 280/743.1 |
| 5,533,755 | 7/1996 | Nelsen et al. | 280/743.1 |

Primary Examiner—Paul N. Dickson
Attorney, Agent, or Firm—Terry T. Moyer; Earle R. Marden

[57] ABSTRACT

An inflatable restraint cushion for use in transportation passive restraint systems is provided. The inflatable restraint cushion according to the invention is of a foldable construction having two panels. The first panel is of generally a pyramidal configuration while the second panel is of an elongated rectangular configuration joined to and extending from the apex of the first panel. The first panel is divided into right and left segments along a center fold line. The right and left segments each contain corresponding depressed sections. The right and left segments of the base are folded towards one another and are seamed together. The second panel is thereafter folded in loop fashion towards the first panel and a single seam is used to join the mating edges of the first and second panels. The presence of the depressed sections results in a cushion configuration having a depressed lower profile which is capable of engulfing the instrument panel of the vehicle.

13 Claims, 4 Drawing Sheets

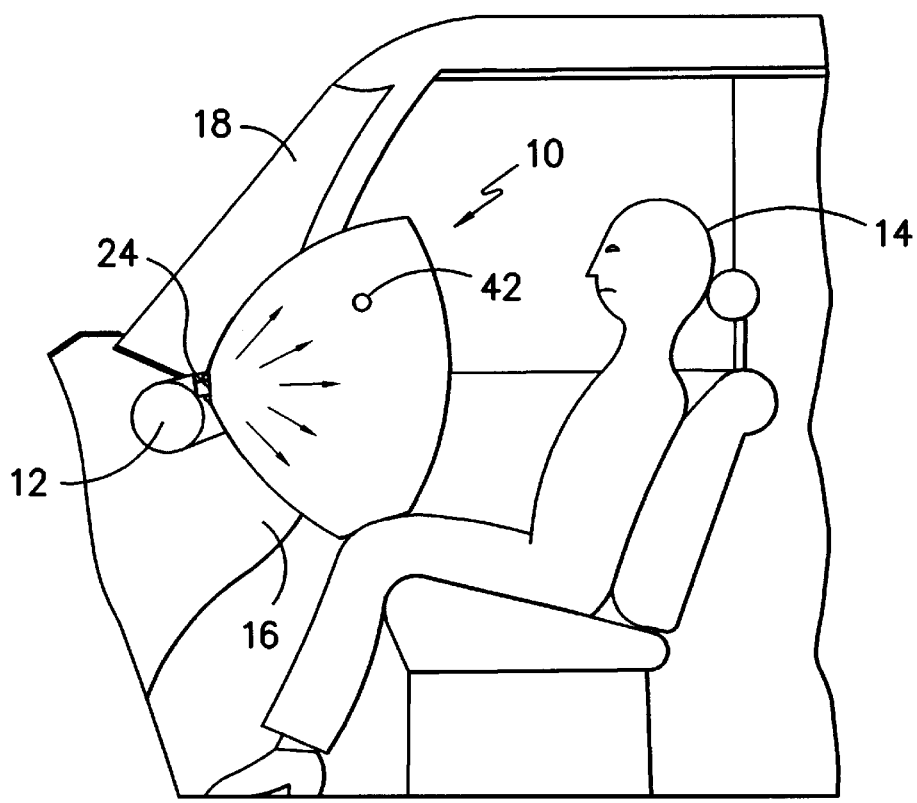
FIG. -1-
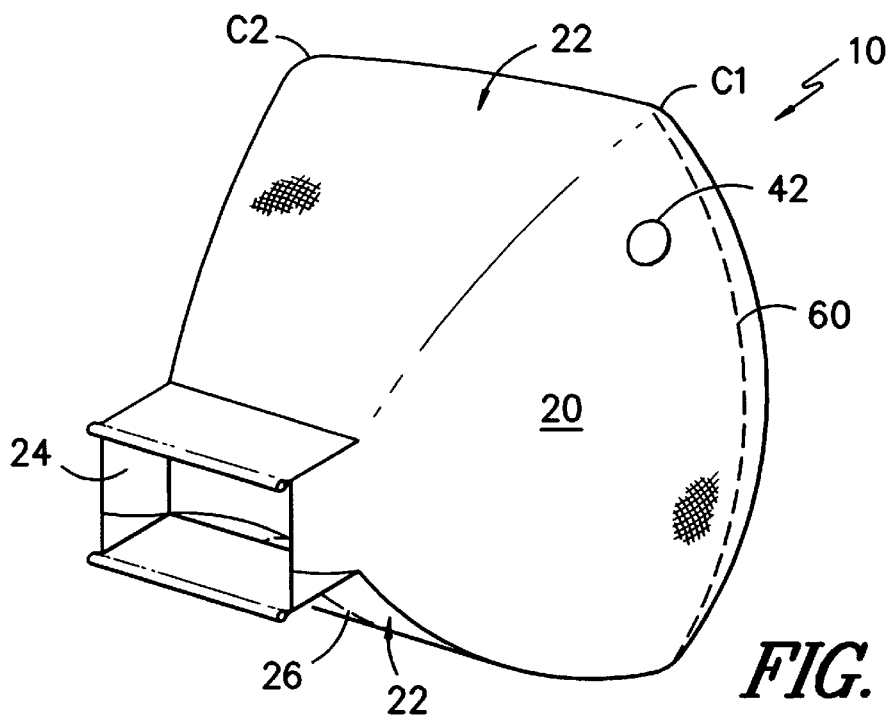
FIG. -1A-

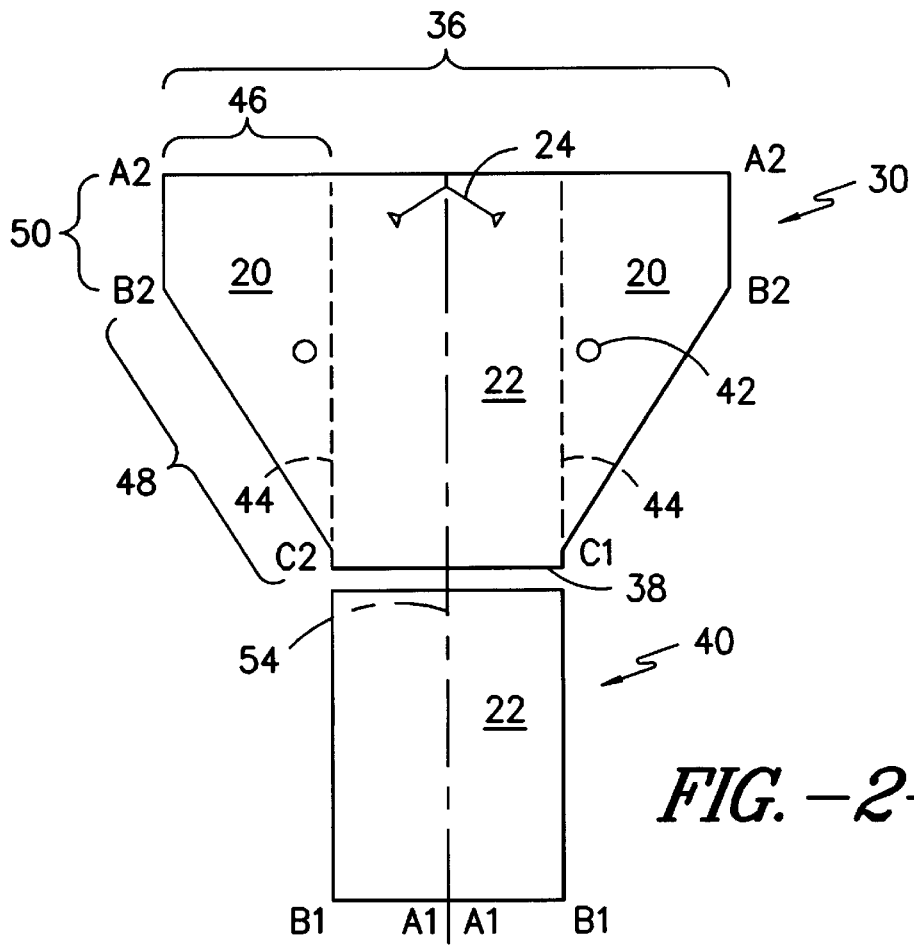
FIG.-2-
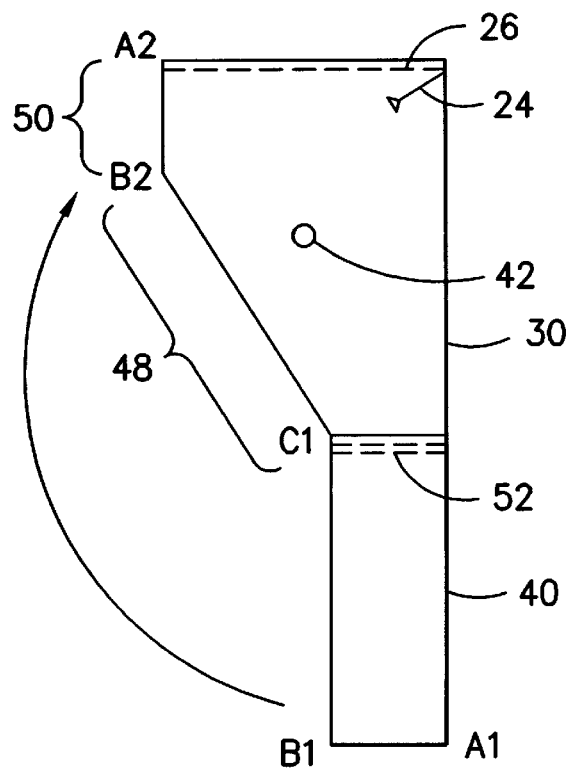
FIG.-3-

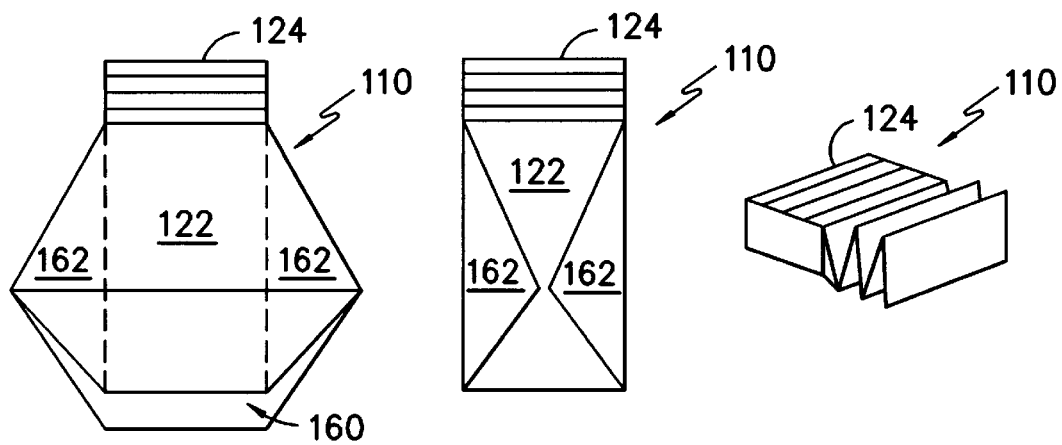
FIG.-4A-    FIG.-4B-   FIG.-4C-
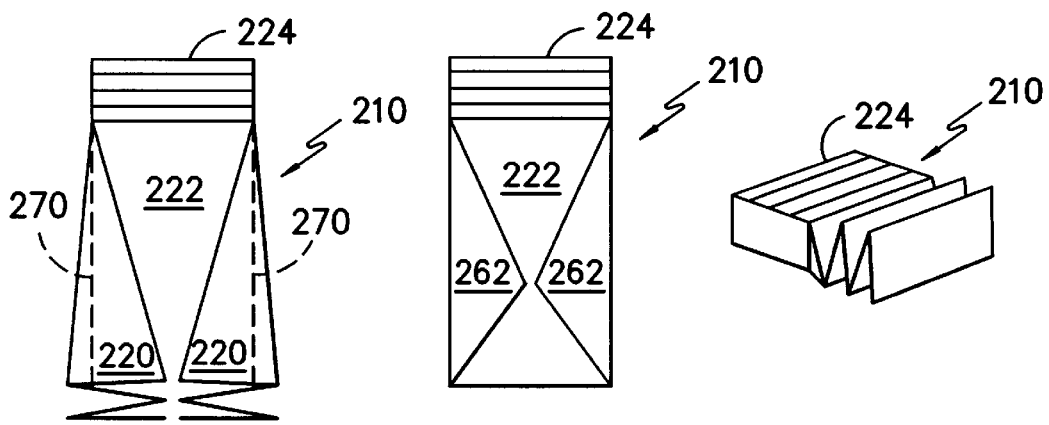
FIG.-5A-    FIG.-5B-   FIG.-5C-
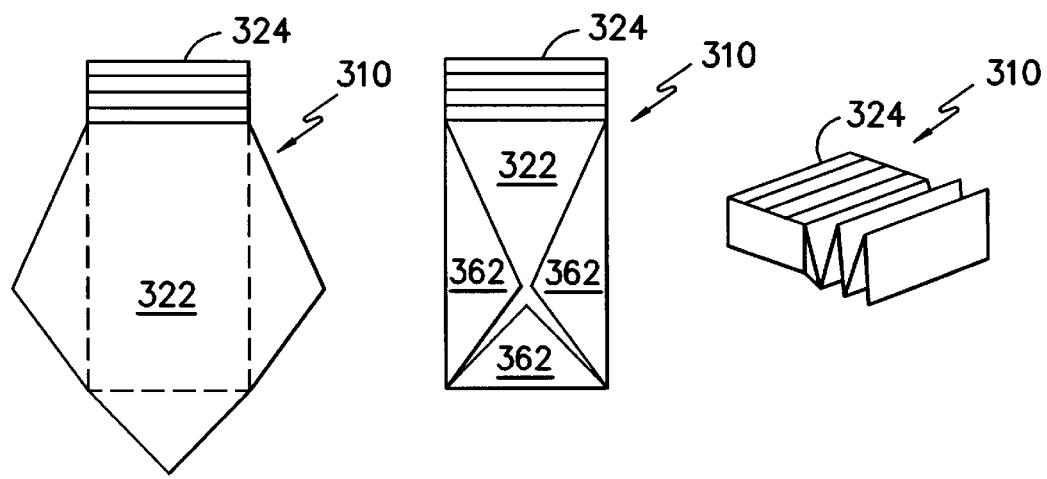
FIG.-6A-    FIG.-6B-   FIG.-6C-

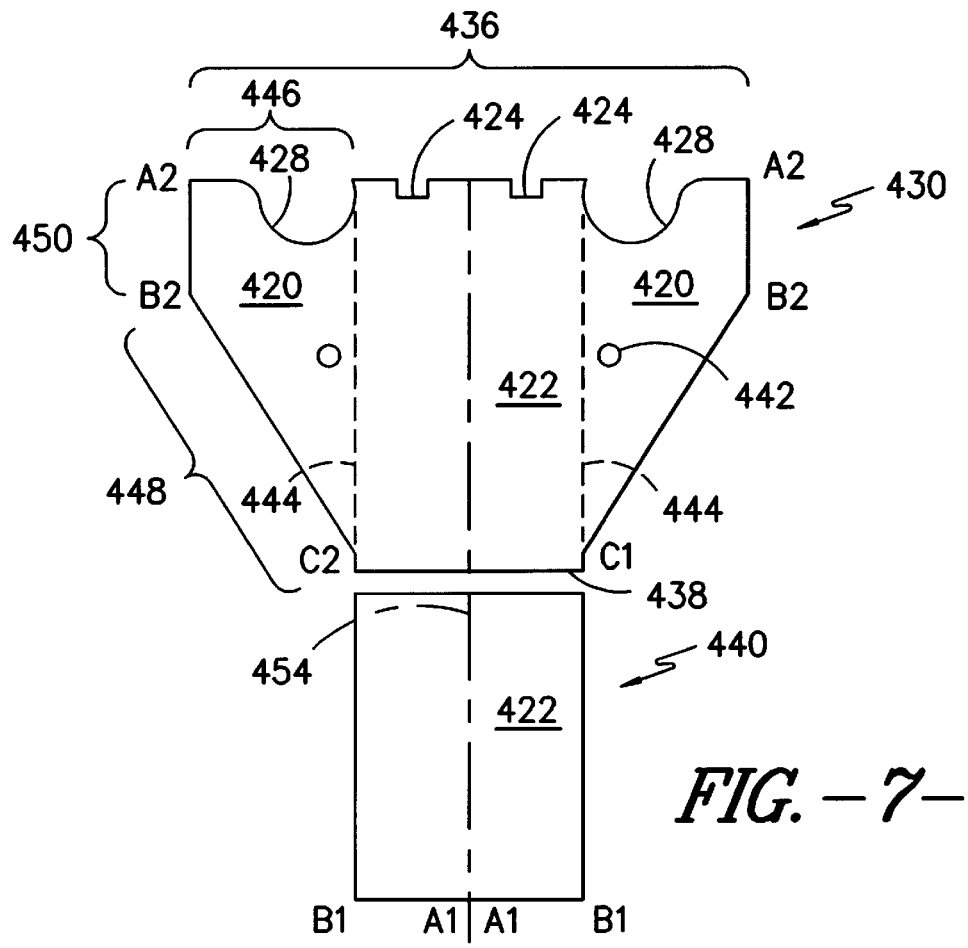
FIG.-7-
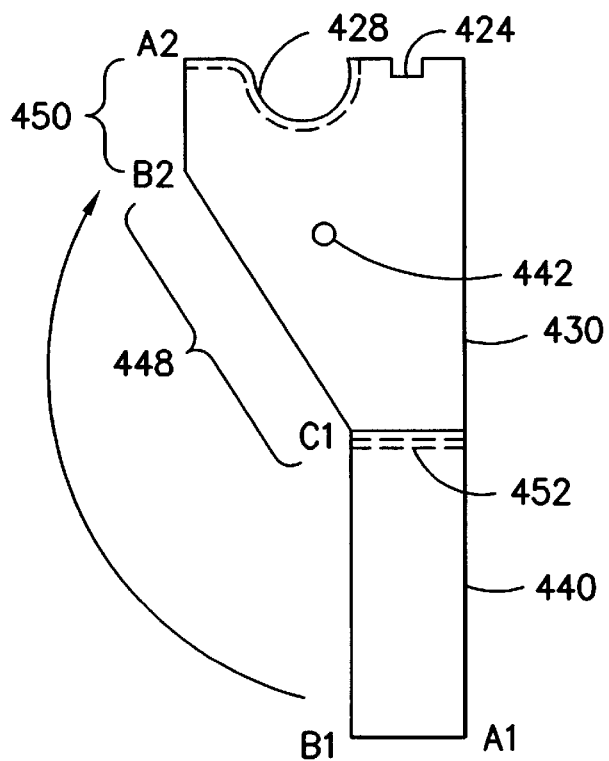
FIG.-8-

SIMPLIFIED AIR BAG CONFIGURATION

CROSS REFERENCE TO RELATED APPLICATIONS

This application is a continuation-in-part of my application Ser. No. 08/916,190 filed Aug. 21, 1997, now U.S. Pat. No. 5,855,393, the contents of which are incorporated herein by reference.

FIELD OF THE INVENTION

The present invention relates generally to vehicle occupant restraint cushions and more particularly to a simplified inflatable cushion for use in opposing relation to a vehicle occupant.

BACKGROUND

An inflatable cushion disposed within a supporting structure such as a dash panel, side door or other fixed portion of a car body in opposing relation to a seat in the vehicle plays an important role in protecting the occupants in a vehicle from injury due to collision against the car body. Typically, the inflatable cushion is inflated rapidly by the pressure of a reaction gas released from an inflator during a collision. This gas generation typically takes place when a gas generating agent in the inflator induces a chemical reaction by a collision signal from a collision detecting sensor when the deceleration of the vehicle exceeds a certain level. The gas which is generated by the generator is then conveyed to the inflatable cushion which expands outwardly as it fills with gas to create a protective barrier between the vehicle occupant and the dash panel or other portion of the vehicle body against which the occupant might otherwise be thrown.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., the teachings of which are incorporated herein by reference.

Inflatable cushions for use in the protection of passengers against frontal or side impacts, must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,416 to Bishop, issued May 28, 1996; U.S. Pat. No. 5,454,594 to Krickl issued Oct. 3, 1995; U.S. Pat. No. 5,423,273 to Hawthorn et al. issued Jun. 13, 1995; U.S. Pat. No. 5,316,337 to Yamaji et al. issued May 31, 1994; U.S. Pat. No. 5,310,216 to Wehner et al. issued on May 10, 1994; U.S. Pat. No. 5,090,729 to Watanabe issued Feb. 25, 1992; U.S. Pat. No. 5,087,071 to Wallner et al. issued Feb. 11, 1992; U.S. Pat. No. 4,944,529 to Backhaus issued Jul. 31, 1990; and U.S. Pat. No. 3,792,873 to Buchner et al. issued Feb. 19, 1974, all of which are incorporated herein by reference.

As will be appreciated, a full bodied cushion having a generally. hemispherical profile may be desirable so as to provide coverage around a dash panel or door structure. The present invention provides an easily manufactured cushion of substantial depth having such a desired geometry.

Moreover, construction of the air bag according to the present invention permits highly efficient utilization of the material from which the air bag panels are cut. That is, the use of a small number of relatively simple substantially straight line geometries permits excellent nesting of the individual cut parts across the width of the formation material. This reduces the amount of wasted material surrounding the cut parts and thereby improves the overall efficiency of the process. Accordingly, the present invention represents a useful advancement over the known art.

OBJECTS AND SUMMARY OF THE INVENTION

In view of the foregoing, it is a general object of the present invention to provide a low cost inflatable occupant restraining system including a cushion of simple and structurally efficient design suitable for withstanding inflation pressures and impact during a collision event.

It is a further object to provide a system for folding such a cushion.

It is a more particular object of the present invention to provide a cushion for use in an inflatable occupant restraint system formed from a relatively small number of cut parts joined together by a small number of seams.

It is yet a more particular object of the present invention to provide a cushion for use in an inflatable occupant restraining system having a profile which surrounds the instrument panel opposing the occupant if deployed from the top of the dash panel.

To achieve the identified objects, it is a feature of the present invention to provide a foldable construction generally defined by two panel sections having mateable geometric profiles. These panel sections may be either cut from the cushion forming material as a single piece or may be cut separately and joined together by a simple flat seam prior to the folding operation.

In accordance with the present invention, an inflatable restraint cushion useful in a transportation passive restraint system is provided.

The potentially preferred embodiment of the cushion has a first fabric panel section having a generally pyramidal configuration. The base of this pyramid preferably has mouth-forming openings cut. The base is divided along a center line into right and left base segment sections. The right and left base segment sections preferably are substantially symmetrical and include corresponding depressed portions along their length which overlay one another when the first fabric panel section is folded in half along its length.

The apex of the pyramid (which has a length less than the base) is joined to a second fabric panel section which has a generally elongated rectangular configuration, such that the first and second fabric panel sections are disposed in proximal relation to one another along a line of attachment. The right and left base segment sections are folded and seamed together thereby forming an inflation pocket within the first fabric panel. The second fabric panel is thereafter folded in loop fashion towards the first fabric panel preferably, enclosing the formed pocket by means of a single seam joining the mating edges of the first and second fabric panels.

Additional objects and advantages of the invention will be set forth in part in the description which follows, and in part will be obvious from the description, or may be learned by practice of the invention. It is, of course, to be understood that both the foregoing general description and the following detailed description are exemplary and explanatory only and are in no way to be construed as restricting the scope of the invention as claimed.

BRIEF DESCRIPTION OF THE DRAWINGS

The accompanying drawings which constitute a part of this specification illustrate a potentially preferred embodiment of the invention and together with the written description serve to explain the principles of the invention.

FIG. 1 is a cut-away side view of the inflatable cushion according to the present invention during deployment between a dash panel and a vehicle occupant.

FIG. 1A is a rear perspective view of the inflatable cushion according to the present invention illustrating a potentially preferred seam arrangement.

FIG. 2 is a plan view of a potentially preferred material panel arrangement utilized in construction of the inflatable cushion according to the present invention.

FIG. 3 is a longitudinal view illustrating a potentially preferred assembly technique for application with the panel arrangement illustrated in FIG. 2.

FIGS. 4A–4C illustrate a first folding technique useful in packing an inflatable cushion according to the present invention.

FIGS. 5A–5C illustrate a second folding technique useful in packing an inflatable cushion according to the present invention.

FIGS. 6A–6C illustrate a third folding technique useful in packing an inflatable cushion according to the present invention.

FIG. 7 is a plan view similar to FIG. 2 illustrating a potentially preferred material panel arrangement useful in deployment from the top of the instrument panel of the vehicle.

FIG. 8 is a longitudinal view similar to FIG. 3 illustrating a potentially preferred assembly technique for application with the panel arrangement illustrated in FIG. 7.

DESCRIPTION OF THE PREFERRED EMBODIMENTS

Reference will now be made in detail to preferred embodiments of the present invention as illustrated in the accompanying drawings. Wherever possible, like elements have been denoted by like reference numerals in the various views.

Turning now to the drawings, in FIG. 1 there is illustrated an inflatable restraint cushion 10 for use with an inflator 12 to protect a vehicle occupant 14 from impacting a dash panel 16, windshield 18 or other interior surface in the event of a collision. As will be noted, the configuration of the inflatable restraint is intended to provide sufficient depth of coverage so as to provide a degree of protection to the vehicle occupant 14 in a number of orientations. In particular, the inflatable restraint is configured to have a generally deep arcuate profile so as to provide good overall coverage.

The inflatable restraint cushion 10 preferably has two side panel sections 20 and a central body panel impact section 22 extending between the side panel sections around the entire center portion of the cushion from one side of the mouth 24 to the other side of the mouth 24. The formation of the mouth 24 is effected by introduction of a seam 26 along a portion of the central body impact section 20 as illustrated through reference to FIGS. 2 and 3.

In FIG. 2 there is illustrated a plan view of a material blank layout useful in formation of the restraint cushion 10 according to the present invention. As can be seen, the material blank is made up of a first material panel 30 having a generally pyramidal configuration having a base segment 36 which is tapered to an apex segment 38. The material blank also includes a second material panel 40 having a generally elongated rectangular configuration.

In the illustrated and potentially preferred embodiment, the first material panel 30 includes a central elongated rectangular portion which forms part of the central body panel 22 of the cushion 10 (FIG. 1A). Disposed on either side of this central elongated rectangular portion are two foldable elements which form the side panel sections 20 of cushion 10. As illustrated, these foldable elements may include one or more vent openings 42 to assist in eliminating the inflation medium from the cushion 10 following impact by the occupant 14.

As shown, in the preferred embodiment, the foldable elements which form the side panels are preferably defined by a base line 44 with a first edge 46 and a second edge 48 extending outwardly therefrom. These edges preferably extend to either end of a side panel apex 50. The length of this side panel apex is preferably about one-half the length of the apex segment 38 of the first material panel 30.

The second material panel 40 is joined to and extends away from the apex 38 of the first material panel 30. This ajoinment may be achieved either by application of a material panel attachment seam 52 (FIG. 3) or by simply cutting the first and second material panels 30, 40 as a single piece. It is to be understood that use of the term "seam" herein includes not only traditional sewn seams but also by way of example only and not limitation, adhesive seams, melt bonded seams, ultrasonic seams and other suitable attachment methods as may be known to those of skill in the art. As illustrated, the upper edge of second material panel 40 extends along and is substantially congruent with the apex 38 of first material panel 30, which in turn defines the width of the central body panel 22. The foldable material blank formed by first and second material panels 30, 40 is preferably substantially symmetrical along a centerline 54 which runs from slits for the mouth opening 24 which in the preferred embodiment is centrally disposed at the base segment 36 of the first material panel and divides the base segment 36 into right and left sides.

The formation of the restraint cushion 10 is preferably effected by first joining together the right and left sides of the base segment 36 of the first material panel along seam line 26 (FIG. 3). This joining process has the affect of forming a pocket within the first material panel 30. Following introduction of the seam line 26, the second material panel 40 is folded in looping fashion towards the first material panel 40 such that the lateral outer edges of the second material panel 40 are mated to the corresponding second edges 48 of the adjacent side panel sections 20 and the bottom edge of the second material panel 40 is mated on either side of the structure to the corresponding side panel apex 50. That is, on either side of the pocket formed within the first panel section, point "A1" is mated to point "A2" and point "B1" is mated to point "B2". A, single seam 60 can then be applied along mated peripheries between points "C1" and "C2", thereby yielding the inflatable seamed configuration of FIG. 1A. The cushion 10 is thereafter preferably turned inside out prior to attachment to the inflator 12.

It is to be appreciated that the first and second material panels 30, 40 may be formed from a number of substances including by way of example only and not limitation, woven fabrics, knitted fabrics, nonwovens, films and combinations thereof. Woven fabrics may be preferred with woven fabrics formed of tightly woven constructions such as plain or panama weave constructions being particularly preferred. Such woven fabrics may be formed of yarns of polyester, nylon 6, nylon 6,6 or other suitable materials as may be known to those of skill in the art. Multifilament yarns of nylon 6,6 having a relatively low denier per filament rating of about 6 denier per filament or less may be preferred. Denier per filament ratings of about 4 denier per filament or less may be preferred for bags requiring particularly good flexibility.

In the instance where a woven fabric is utilized, the first and second material panels 30, 40 are preferably cut from the fabric such that the centerline 54 runs substantially parallel to either the warp or the fill direction. That is, substantially in the direction of either the warp or the fill yarns. In application, yams with deniers of about 315 to 840 are believed to be particularly useful in the cushion 10 of the present invention. Yarns with deniers in the range of about 400 to 650 may be most preferred.

While the first and second material panels 30, 40 may be formed of the same material, it is contemplated that these elements may also be of differing materials and/or constructions. By way of example only and not limitation, the first material panel 30 may be formed from an uncoated, relatively high permeability fabric having a permeability of about 2 CFM/sq. ft. or higher while the second material panel 40 may be formed from a coated or uncoated fabric having an air permeability of about 1 CFM/sq. ft. or less when measured at a differential pressure of 0.5 inches of water across the fabric. In the event that a coating is utilized on one or both of the material panels, neoprene or silicone may be preferred. It is, of course, to be understood that aside from the use of coatings, differing characteristics in the panels may also be achieved through the use of fabrics incorporating differing weave densities and/or finishing treatments as may be known to those of skill in the art.

As is stated above, it is a desirable feature of a restraint cushion that it be easily foldable so as to fit within the small space available within the deployment module while still permitting relatively unrestricted deployment. To this end, folding techniques useful in packaging the restraint cushion 10 according to the present invention as well as other expansible bag configurations have been developed.

The sequential steps of the folding techniques as developed are illustrated in FIGS. 4A–4C, 5A–5C, and 6A–6C. Turning to FIGS. 4A–4C, there is illustrated a representative cushion 110 which is expansible to a three dimensional structure upon introduction of an inflation medium through a mouth opening 124.

According to a first procedure for folding such a cushion 110, a fold 160 is introduced across the center panel 122. This fold 160 extends across the body of the cushion in a direction substantially parallel to the widest dimension of the mouth opening 124. Simultaneously with the introduction of the fold 160, the material on either side of the cushion is pulled away from the vicinity of the center panel to form two foldable flaps 162. As illustrated in FIG. 4B, the foldable flaps 162 are then folded inward on top of the center panel 122 thereby resulting in the illustrated preliminary flat folded configuration. This preliminary flat folded configuration is then either rolled or folded in accordion fashion from the fold 160 towards the mouth opening 124 (FIG. 4C). As will be appreciated, the performance of such a folding operation yields a compact structure of a configuration which is extremely well adapted for storage within an inflation module as is used within an airbag restraint system.

In FIGS. 5A–5C, there is illustrated a second folding procedure for use on an expansible restraint cushion. In this second procedure, a longitudinal pleat 270 is introduced at the approximate middle of either side panel of the cushion 210. The material outlying the pleats so formed is then folded as flaps 262 into the interior of the cushion structure corresponding to the center panel 222, thereby resulting in the preliminary flat folded configuration as illustrated in FIG. 5B. This preliminary flat folded configuration is then either rolled or folded in accordion fashion towards the mouth opening 224 in the manner illustrated in FIG. 5C.

In FIGS. 6A–6C there is illustrated a third folding procedure for use in packaging an expansible restraint cushion. In this third procedure, material is collected and pulled away from the center panel 322 of the cushion 310 without the introduction of new pleats or folds. The material collected is thereafter folded as flaps 362 towards the interior of the center panel 322, thereby resulting in the preliminary flat, folded configuration as illustrated in FIG. 6B. This preliminary flat, folded configuration is then either rolled or folded in accordian fashion towards the mouth opening 324 in the manner illustrated in FIG. 6C.

In FIG. 7, there is illustrated in plan view a material blank layout which is potentially useful in formation of a restraint cushion according to the present invention when it is desired to produce a cushion possessing a depressed profile which conforms to and surrounds the dash panel 16.

While the selection of a desirable cushion profile is dependent principally upon the configuration of the vehicle itself and, hence, must be ultimately determined by the automobile manufacturer, it is believed that in general cushions characterized by a depressed lower profile are potentially desirable in so called top mounted restraint systems wherein the cushion is deployed from the top of the dash panel and held in place by the combination of the dash panel 16 and the windshield 18. This deployment system may be contrasted to frontal deployment wherein the cushion comes straight out of the dash panel towards the vehicle occupant without substantial use of the windshield.

As illustrated in FIGS. 7 and 8, the first material panel 430 includes a central elongated rectangular portion which forms part of the central body panel 422 in the same manner as previously described in relation to FIG. 2. Disposed on either side of the central elongated rectangular portion are two foldable elements 420 which form the side panel sections of the resulting cushion. As illustrated, thee foldable elements 420 preferably each include a depressed segment 428 disposed along their upper edges 446. These depressed segments are preferably symmetrical with respect to one another so as to permit them to mate in overlaying relation when the material blank is folded along its centerline 454 (FIG. 8). While the depressed segments 428 are preferably of generally an arcuate profile, it is to be understood that other geometries including by way of example rectangles, triangles, trapezoids and the like could likewise be utilized if desired.

As will be readily appreciated, the formation of the restraint cushion from the material blanks as illustrated in FIGS. 7 and 8 is substantially similar to the formation practices described with respect to FIGS. 2 and 3. Specifically, the material blank is folded along centerline 454 and a seam line is introduced along the juncture formed between the right and left sides of the base dimension 436.

As illustrated, this seam preferably conforms with the profile of the upper edge of the folded structure from the point "A2" to a point just past the overlapping depressed segments 428 so as to form a mouth 424 for introduction of the inflation medium during deployment.

Following introduction of the seam along the upper edge, the second material panel 440 is preferably folded in looping fashion towards the first material panel 430 such that the lateral outer edges of the second material panel 440 are mated to the corresponding edge 448 of the adjacent side panel section 420 and the bottom edge of the second material panel 440 is mated on either side of the structure to the corresponding side panel segment 450. That is, on either side of the pocket formed within the first panel section, point "A1" is mated to point "A2" and point "B1" is mated to point "B2". A single seam can then be applied along the mated peripheries between points "C1" and "C2". The cushion is thereafter preferably turned inside out for attachment to an inflation module 12 deep within the dash panel 16.

As will be appreciated, the presence of the depressed segments 428 in adjacent relation to the mouth opening 424 has the result of providing a cushion which includes a depressed lower profile due to the enhanced angle the fabric takes in that region. This provides a cushion which can be deployed upwardly, which nonetheless tends to engulf the instrument panel opposing the occupant.

While the invention has been illustrated and described in relation to certain preferred embodiments, other embodiments will be apparent to those skilled in the art from consideration of the specification and practice of the invention as herein disclosed. It is, therefore, intended that the specification be considered as exemplary only, with the true scope of the invention being defined by the allowable claims and equivalents thereto.

What is claimed is:

1. A restraint system for use in a passenger vehicle, said restraint system comprising an inflatable cushion wherein said inflatable cushion comprises:

a first panel section of a generally pyramidal configuration including a base of a first length and an apex of a second length wherein said first length is greater than said second length, said base being divided along a centerline into substantially symmetrical right and left base segment sections, each of said right and left base segment sections including depressed profile segments;

a second panel section of a generally elongated rectangular configuration, said second panel section extending from said apex segment of said first panel section to form a foldable material blank;

said right and left base segment sections being joined together along upper edges so as to form an inflation pocket within said first panel section;

said second panel section being mated to and enclosing said pocket by means of a seam extending between edges of said first panel section and mating edges of said second panel section.

2. The invention as in claim 1, wherein said depressed profile segments have a generally arcuate profile.

3. The invention as in claim 1, wherein said depressed profile segments have a generally rectangular profile.

4. The invention as in claim 1, wherein said first panel section includes one or more vent openings for the dispersion of inflation gas.

5. The invention as in claim 1, wherein at least one of said first and second panel sections is formed from a fabric comprising a plurality of yarns of synthetic material.

6. The invention as in claim 5, wherein said fabric is a woven fabric.

7. The invention as in claim 5, wherein said synthetic material is nylon.

8. The invention as in claim 5, wherein said yarns are multifilament yarns having a linear density of about 315 denier to about 840 denier characterized by a filament linear density of about 6 denier per filament or less.

9. The invention as in claim 1, wherein said first and second panel sections are cut as a unitary blank of material.

10. The invention as in claim 1, wherein said first panel section is formed from a woven fabric having a plurality of warp yarns running in a first direction interwoven with a plurality of fill yarns running in a second direction, wherein said first and second directions are substantially perpendicular to one another such that a line running perpendicular to both said base and said apex is substantially parallel to one of said first or second directions.

11. The invention as in claim 10, wherein said second panel section is formed from a woven fabric having a plurality of warp yarns running in a first direction interwoven with a plurality of fill yarns running in a second direction wherein said first and second directions are substantially perpendicular to one another such that a line running along the length of said second panel section perpendicular to said apex is substantially parallel to one of said first or second directions.

12. The invention as in claim 1, wherein said first panel section comprises an uncoated fabric and said second panel section comprises a coated textile fabric.

13. The invention as in claim 1, wherein said first panel section comprises an uncoated fabric characterized by an air permeability of not less than about 2 cubic feet per minute per square foot of fabric at a pressure of 0.5 inches of water and said second panel section comprises a fabric characterized by an air permeability of not greater than 1 cubic foot per minute per square foot of fabric at a pressure of 0.5 inches of water.

* * * * *